M. LEITCH.
EMULSIFIER.
APPLICATION FILED JUNE 14, 1915.

1,266,501.

Patented May 14, 1918.

Inventor:
Meredith Leitch
By Pennie, Davis & Marvin
Attorneys

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

EMULSIFIER.

1,266,501.   Specification of Letters Patent.   Patented May 14, 1918.

Application filed June 14, 1915. Serial No. 34,061.

*To all whom it may concern:*

Be it known that I, MEREDITH LEITCH, a citizen of the United States, and residing at Poughkeepsie, county of Dutchess, State of New York, have invented certain new and useful Improvements in Emulsifiers; and I do hereby declare the following to be a full, clear, and exact description of the invention, such as will enable others skilled in the art to which it appertains to make and use the same.

The present invention relates to improvements in centrifugal devices for the formation of more or less permanent mixtures, commonly called emulsions, from two materials such as a fatty material and a watery material. More particularly, it relates to an apparatus which is an improvement upon the apparatus illustrated and described in the application of Leitch and Wright, Serial No. 825,778, filed March 19, 1914; and it comprises a centrifugal emulsifier of the same general type illustrated and described in such application, in which a sediment collecting chamber is provided with which the emulsifying elements are connected.

In the formation of emulsions of fatty materials with watery materials, such as the formation of cream from sweet butter and water containing milk powder dissolved therein, it has been found that small insoluble particles of the raw materials sometimes collect in the discharge passages of the emulsifying elements and eventually tend to clog them and to stop the operation of the apparatus. The apparatus of the present invention enables such insoluble particles to be separated without interference in the operation of the emulsifying elements.

I will now proceed to describe my invention more in detail with particular reference to the embodiment thereof, illustrated on the accompanying drawing, it being intended and understood that the invention will be illustrated by, but is not limited to, the specific embodiment thereof so illustrated and described.

In the accompanying drawing.

Similar letters of reference indicate similar parts throughout the several views.

Figure 1:
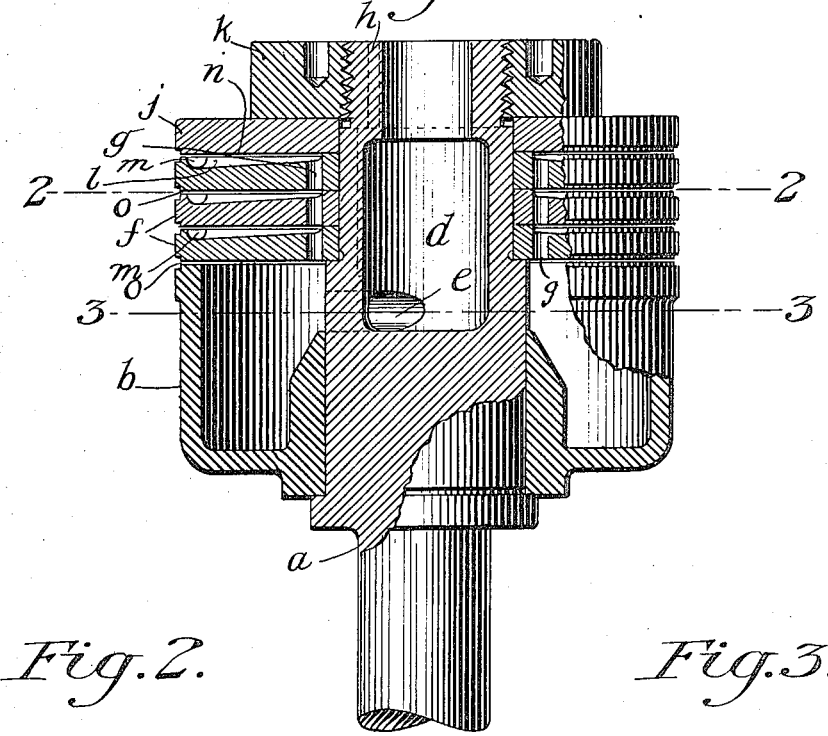
Figure 1 represents, partly in section and partly in elevation, an emulsifier constructed in accordance with my invention.

In the apparatus illustrated, the shaft, by means of which the emulsifier is supported and rotated, is indicated at $a$, this shaft being supported and driven in any suitable or approved manner. This shaft is shown as hollow at its upper end and as having a central receiving chamber $d$ therein provided with outwardly opening discharge passages $e$, which are advantageously arranged tangentially with respect to said chamber. Suitably mounted upon the shaft $a$ is a sediment collecting chamber or bowl $b$, this chamber being illustrated as supported by a flange upon the shaft and as extending upwardly around the shaft. Arranged above the sediment collecting chamber $b$ and surrounding the upper part of the outer wall of the receiving chamber $d$ is the emulsifying device made up of the rings $f$ supported by the shaft $a$ and having at their top a ring $j$ held in place by a clamping nut $k$. Each of the rings $f$ is shown as provided in its upper surface with radially extending grooves $l$ increasing in depth outwardly, and terminating in an annular groove $m$. These rings are spaced apart to provide a thin annular opening therebetween, and to provide a thin narrow discharge passage outwardly from the annular groove $m$. Extending upwardly through these rings $f$ near their inner portions are the passages $g$ by means of which the mixture to be emulsified is received from the sediment collecting chamber $b$. Arranged between the rings $f$ and the shaft $a$ are air ducts or vents $h$ extending upwardly from the sediment collecting chamber to the top of the apparatus, one of the ducts being shown in dotted lines in Fig. 1. Instead of having the lower ring $f$ contacting with the top of the chamber $b$ and completely closing the top of the same, this ring may advantageously be spaced apart to leave a thin discharge passage $o$ of a width practically the same as the width of the other passages $o$, so that discharge in the form of emulsion will take place at this point also.

Figures 2, 3:
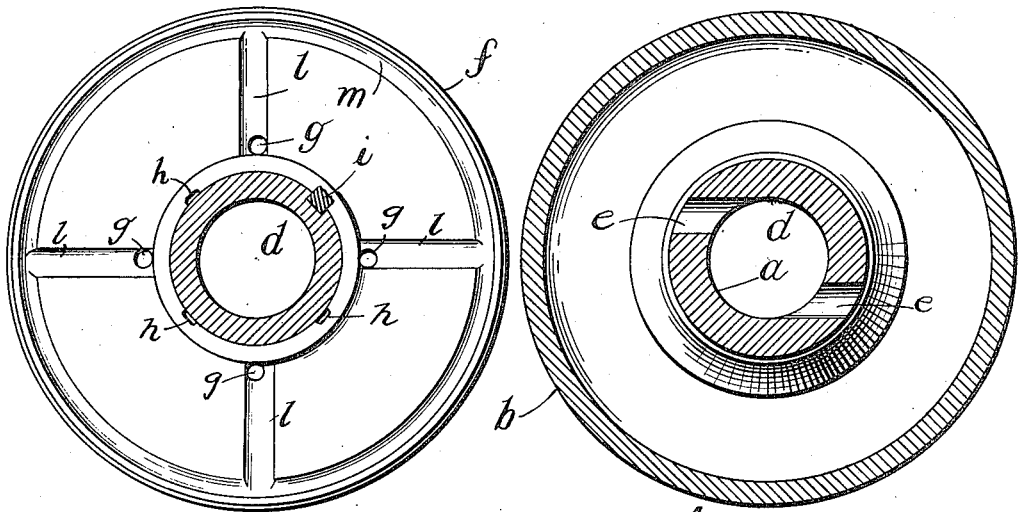
Fig. 2 is a transverse section taken on the line 2—2 of Fig. 1.
Fig. 3 is a transverse section taken on the line 3—3 of Fig. 1.

In the operation of the apparatus of the present invention, the material to be emulsified, which is advantageously first roughly mixed, is fed into the central chamber $d$ in any suitable or approved manner, from which chamber it is thrown out through the discharge passages *e* into the sediment collecting chamber *b*, the tangential arrangement of the passages *e* facilitating this discharge. In the chamber *b* any solid particles heavier than the liquid are thrown outward by centrifugal force and tend to move toward the bottom of the chamber and against the outer wall where they accumulate. The liquid, freed from such particles, rises and passes upwardly through the passages *g* in the rings and thence outwardly through the grooves *l* from which it is distributed between the rings and into the annular groove *m*, the liquid finally escaping through the thin annular discharge passages *o* in the form of the desired emulsion. Where a similar passage *o* is provided between the lower ring *f* and the top of the sediment collecting chamber, a similar discharge of the emulsion will take place at this point. It will be seen that the ring *j* which is arranged above the upper ring *f* acts as a closure or cover in the same manner that the bottoms of the different rings *f* act as covers for each other. The air ducts *h* are provided to permit any air which enters the sediment collecting chamber to escape without interfering with the operation of the emulsifying elements. In order that the rings *f* may be properly located with respect to each other, and to the supporting shaft, these rings are provided with a key *i*, clearly shown in Fig. 2. It will be seen that the rings are clamped by the nut *k* and that by removing this nut the rings can be removed and cleaned and the sediment chamber uncovered. It will be seen that the apparatus of the present invention enables sediment forming particles of solid matter to be removed and collected without interfering with the operation of the emulsifying elements; and that provision is made for the escape of air entrained with the material to be emulsified without interfering with the emulsifying elements. The emulsifying elements are accordingly permitted to operate in a particularly advantageous manner so that large amounts of the liquid can be emulsified in an apparatus of small size. It will, of course, be understood that the number of emulsifying elements can be increased and decreased, and that the size of these elements can also be somewhat varied, in order to obtain a larger or smaller capacity and varying degrees of fineness of emulsion. It will also be understood that suitable variations and modifications can be made in the apparatus as illustrated, without departing from its spirit and scope.

Inasmuch as the emulsifying elements are connected with the inner portion of the sediment collecting chamber and this chamber extends outwardly therebeyond so that the heavier particles will be thrown outwardly by centrifugal force against the outer walls of this chamber, the operation of the elements and of the sediment collecting chamber will be much the same whether arranged above or below this chamber; but the arrangement of the elements above this chamber, as shown, has the advantage that the settling action of gravity assists the centrifugal separation of the sediment and causes this sediment to move outwardly and downwardly, away from the inlets to the emulsifying elements.

What I claim is:

1. A rotatable emulsifier provided with a sediment collecting chamber, means for introducing the mixture to be emulsified, and one or more emulsifying elements having emulsifying discharge orifices, said emulsifying elements having inlet passages leading from said sediment chamber and having outwardly extending distributing passages terminating in the emulsifying discharge orifices.

2. A rotatable emulsifier provided with a central receiving chamber, an annular sediment collecting chamber having inlet passages leading from said receiving chamber, and one or more emulsifying elements having emulsifying discharge orifices, said emulsifying elements having inlet passages leading from said sediment chamber and having outwardly extending distributing passages terminating in the emulsifying discharge orifices.

3. A rotatable emulsifier provided with a sediment collecting chamber, means for introducing the mixture to be emulsified, and one or more emulsifying elements arranged above said sediment chamber and having emulsifying discharge orifices, said emulsifying elements having inlet passages leading from said sediment chamber and having outwardly extending distributing passages terminating in the emulsifying discharge orifices.

4. A rotatable emulsifier provided with a central receiving chamber, an annular sediment collecting chamber surrounding said receiving chamber and communicating therewith, and one or more emulsifying elements surrounding said receiving chamber and having emulsifying discharge orifices, said emulsifying elements having inlet passages leading from said sediment chamber and having outwardly extending distributing passages terminating in the emulsifying discharge orifices.

5. A rotatable emulsifier provided with a central receiving chamber, an annular sediment collecting chamber arranged to receive the mixture to be emulsified from said receiving chamber, and a plurality of emulsifying elements arranged to receive the mixture from said sediment collecting chamber, said emulsifying elements having radial and annular distributing passages terminating in emulsifying discharge orifices.

6. A rotatable emulsifier provided with a sediment collecting chamber having an inlet for the mixture to be emulsified, and a plurality of emulsifying elements superposed upon said chamber and communicating therewith near their inner portions, said elements having outwardly extending distributing passages terminating in emulsifying discharge orifices.

7. A rotatable emulsifier provided with a central receiving chamber having tangential discharge passages, an annular sediment collecting chamber communicating with said passages, and one or more emulsifying elements arranged to receive the mixture to be emulsified near their inner portions and to discharge the same outwardly therethrough.

8. A rotatable emulsifier provided with a central receiving chamber, an annular sediment collecting chamber having supply passages near its upper end leading from the receiving chamber, and one or more emulsifying elements having supply passages leading from said sediment collecting chamber near the upper end thereof, and having outwardly extending distributing passages terminating in emulsifying discharge orifices.

9. A rotatable emulsifier provided with a sediment collecting chamber having an inlet for the mixture to be emulsified, a plurality of emulsifying elements superposed upon said chamber and communicating therewith near their inner portions, said elements having outwardly extending distributing passages terminating in emulsifying discharge orifices, and an air vent leading from the inner portion of said sediment collecting chamber.

10. A rotatable emulsifier provided with a central receiving chamber, an annular sediment collecting chamber having supply passages near its upper end leading from the receiving chamber, and one or more emulsifying elements surrounding said receiving chamber and superposed upon said sediment collecting chamber, said elements having supply passages leading from said sediment collecting chamber near the upper end thereof, and having outwardly extending distributing passages terminating in emulsifying discharge orifices.

11. A rotatable emulsifier provided with a sediment collecting chamber, means for introducing the mixture to be emulsified, one or more emulsifying elements having inlet passages leading from said sediment chamber and having outwardly extending distributing passages terminating in emulsifying discharge orifices, and an air vent leading from said sediment chamber.

12. A rotatable emulsifier provided with a central receiving chamber, an annular sediment collecting chamber having supply passages leading from the receiving chamber, and one or more emulsifying elements having supply passages leading from said sediment collecting chamber and having outwardly extending distributing passages terminating in discharge orifices, said sediment collecting chamber being spaced apart from the adjacent element to form an emulsifying discharge passage therebetween.

13. A rotatable emulsifier provided with a central receiving chamber, an annular sediment collecting chamber having supply passages leading from the receiving chamber, one or more emulsifying elements having supply passages leading from said sediment collecting chamber and having outwardly extending distributing passages terminating in emulsifying discharge orifices, and removable means for clamping said emulsifying elements in place.

14. A rotatable emulsifier provided with a central receiving chamber, an annular sediment collecting chamber arranged around said receiving chamber and having supply passages leading therefrom, one or more emulsifying elements arranged above said sediment collecting chamber and around the receiving chamber and having supply passages leading from said sediment collecting chamber, and a clamping nut for clamping said elements in place with respect to said receiving chamber.

15. A rotatable emulsifier provided with a central receiving chamber, an annular sediment collecting chamber having supply passages leading from the receiving chamber, and a plurality of emulsifying elements having supply passages therethrough leading from said sediment collecting chamber, each of said elements having outwardly extending distributing passages leading from said supply passages and terminating in emulsifying discharge orifices.

16. A rotatable emulsifier comprising a shaft having in one end a central receiving chamber provided with outwardly opening discharge passages, an annular sediment collecting chamber mounted upon said shaft and communicating with said discharge passages, and one or more emulsifying elements mounted upon said shaft and arranged to receive the mixture to be emulsified from said sediment collecting chamber.

In testimony whereof I affix my signature, in presence of two witnesses.

MEREDITH LEITCH.

Witnesses:
CHARLES L. POWELL,
GRACE McCANN.